United States Patent
Li et al.

(10) Patent No.: US 10,170,734 B2
(45) Date of Patent: Jan. 1, 2019

(54) TOP COVER OF POWER BATTERY AND POWER BATTERY

(71) Applicant: CONTEMPORARY AMPEREX TECHNOLOGY CO., LIMITED, Ningde (CN)

(72) Inventors: Quankun Li, Ningde (CN); Jian Guo, Ningde (CN); Peng Wang, Ningde (CN); Pinghua Deng, Ningde (CN); Kai Wu, Ningde (CN); Yongshou Lin, Ningde (CN)

(73) Assignee: Contemporary Amperex Technology Co., Limited, Ningde, Fujian Province (CN)

( * ) Notice: Subject to any disclaimer, the term of this patent is extended or adjusted under 35 U.S.C. 154(b) by 139 days.

(21) Appl. No.: 15/349,938

(22) Filed: Nov. 11, 2016

(65) Prior Publication Data

US 2017/0352846 A1   Dec. 7, 2017

(30) Foreign Application Priority Data

Jun. 7, 2016   (CN) .......................... 2016 1 0399653

(51) Int. Cl.
*H01M 2/00* (2006.01)
*H01M 2/04* (2006.01)
(Continued)

(52) U.S. Cl.
CPC ......... *H01M 2/0473* (2013.01); *H01M 2/043* (2013.01); *H01M 2/345* (2013.01);
(Continued)

(58) Field of Classification Search
CPC .... H01M 2/0473; H01M 2/043; H01M 2/345; H01M 10/0525
See application file for complete search history.

(56) References Cited

U.S. PATENT DOCUMENTS

| 2015/0171411 | A1 | 6/2015 | Kobayashi et al. |
| 2015/0188119 | A1 | 7/2015 | Gao et al. |
| 2015/0243961 | A1* | 8/2015 | Urano ..................... H01M 2/06 429/61 |

FOREIGN PATENT DOCUMENTS

| CN | 101567432 A | 10/2009 |
| CN | 104577029 A | 4/2015 |

(Continued)

OTHER PUBLICATIONS

From EP 17151004, European Search Report, dated May 9, 2017.
(Continued)

*Primary Examiner* — Cynthia H Kelly
*Assistant Examiner* — Monique M Wills
(74) *Attorney, Agent, or Firm* — Ladas & Parry, LLP

(57) ABSTRACT

The present application provides a top cover of a power battery, including a top cover plate, a first electrode unit and a second electrode unit, the top cover plate is provided with a deformable plate connecting hole and an insulation piece accommodating portion, the first electrode unit includes a deformable plate, a conductive plate and a first insulation piece, the deformable plate seals the deformable plate connecting hole, the conductive plate is located underneath the deformable plate, the first insulation piece includes a top cover plate connecting portion and a conductive plate connecting portion, the top cover plate connecting portion extends into the insulation piece accommodating portion and is fixed thereof, the conductive plate is insulated and fixed with the top cover plate through the conductive plate connecting portion. The present application further provides a power battery, including the top cover of the power battery.

17 Claims, 8 Drawing Sheets

(51) Int. Cl.
  *H01M 2/34* (2006.01)
  *H01M 10/0525* (2010.01)
(52) U.S. Cl.
  CPC .... *H01M 10/0525* (2013.01); *H01M 2200/20* (2013.01); *H01M 2220/20* (2013.01)

(56) References Cited

FOREIGN PATENT DOCUMENTS

| | | |
|---|---|---|
| CN | 204946952 U | 1/2016 |
| CN | 205723667 U | 11/2016 |
| JP | 2002-208389 A | 7/2002 |

OTHER PUBLICATIONS

Office Action dated Feb. 9, 2018 for Chinese Patent Application No. 201610399653.0 and its English translation provided by Applicant's foreign council.

\* cited by examiner

TOP COVER OF POWER BATTERY AND POWER BATTERY

CROSS-REFERENCE TO RELATED APPLICATIONS

This application claims the priority to and the benefit of Chinese Patent Application No. 2016103996530 filed on Jun. 7, 2016, the content of which is incorporated herein by reference in its entirety.

TECHNICAL FIELD

The present application relates to the field of Li-ion battery production technologies and, particularly, relates to a top cover of a power battery and the power battery

BACKGROUND

In the situation that a battery or a module is over charged, when excessive heat is generated or the pressure in the interior of a power battery increases due to resolving of the electrolyte, the battery will burn or explode. Therefore, before the battery is out of control, a structure is desired to cut off the main circuit of the battery, and prevent the battery from being charged continuously.

The battery in the prior art generally has two circuit breaking manners, that is, passive circuit breaking and active circuit breaking. The active circuit breaking manner generally provides a deformable plate and a conductive plate at the bottom of a positive electrode terminal. When a current is normally flowing, the current passes through the conductive plate and the deformable plate, and then arrives at the electrode terminal. When the battery is over charged, and generates air in the interior, the deformable plate turns and breaks the connection with the conductive plate, so as to cut off the main circuit, so that the battery is no longer charged, thereby guaranteeing safety of the cell.

However, in such connection structure, since the deformable plate and the conductive plate are both arranged underneath the positive electrode terminal, therefore, the thickness of the top cover of the power battery at the positive electrode is increased, which further increases the volume of the power battery, wasting too much space, especially the space between a corresponding negative electrode terminal and a naked cell.

As we known, a certain air pressure is needed to push the deformable plate to tear the conductive plate, both the deformable plate and the conductive plate cannot be made too strong. Relatively speaking, it is preferred to be a little bit weaker. The conductive plate is connected with the deformable plate at the top, and is connected with the naked cell electrode tab at the bottom, if there is no other component for auxiliary fixing, it is easy to be broken and loses efficacy during the process of normal assembling and using, or the conductive plate is conductively connected with the deformable plate or the top cover plate after being deformed.

In view of the above, it is necessary to design a conductive plate fixing structure, which achieves the effect of fixing and insulation and, at the same time, increases the utilization space of the interior of the battery as much as possible.

SUMMARY

The present application provides a top cover of a power battery and the power battery, which can firmly fixed a conductive plate without occupying too much interior space of the power battery.

The present application provides a top cover of a power battery, including:

a top cover plate, a first electrode unit and a second electrode unit, the top cover plate is provided with a deformable plate connecting hole and an insulation piece accommodating portion, the first electrode unit comprises a deformable plate, a conductive plate and a first insulation piece, the deformable plate seals the deformable plate connecting hole, the conductive plate is located underneath the deformable plate, and is electrically connected with the deformable plate, the first insulation piece comprises a top cover plate connecting portion and a conductive plate connecting portion, the top cover plate connecting portion extends into the insulation piece accommodating portion and is fixed with the insulation piece accommodating portion, the conductive plate is insulated and fixed with the top cover plate through the conductive plate connecting portion, the deformable plate deforms and is insulated from the conductive plate when a pressure in an interior of the power battery exceeds a reference pressure.

Preferably, the insulation piece accommodating portion is a through hole with a top diameter larger than a bottom diameter.

Preferably, the insulation piece accommodating portion is a blind hole with a top diameter larger than a bottom diameter.

Preferably, the insulation piece accommodating portion is an embedded groove.

Preferably, the blind hole is sunken at a lower surface of the top cover plate, or the blind hole is protruded from a lower surface of the top cover plate.

Preferably, the embedded groove is sunken at a lower surface of the top cover plate, or the embedded groove is protruded from a lower surface of the top cover plate.

Preferably, the top cover plate connecting portion is a connecting column, the connecting column extends into the insulation piece accommodating portion, and is fixed with the insulation piece accommodating portion through hot melting.

Preferably, the top cover plate connecting portion is a clamping connection structure, the clamping connection structure is clamped with the insulation piece accommodating portion.

Preferably, multiple insulation piece accommodating portions are defined, which are arranged around the deformable plate connecting hole, the number of the top cover plate connecting portion is the same as the number of the insulation piece accommodating portion, and the top cover plate connecting portion corresponds to the insulation piece accommodating portion respectively.

Preferably, the conductive plate connecting portion comprises a plurality of independent parts, each of the independent part is provided with at least one top cover plate connecting portion.

Preferably, an assembling hole is provided on the conductive plate connecting portion, the assembling hole is opposite to the deformable plate connecting hole, the conductive plate is fixed in the assembling hole.

Preferably, the conductive plate connecting portion is further provided with a circle of blocking ring, a hole diameter of the assembling hole is larger than the deformable plate connecting hole, the blocking ring is arranged around an inner wall of a top of the assembling hole, and covers the deformable plate connecting hole.

Preferably, a circle of clamping slot is provided at a bottom of the conductive plate connecting portion, an edge of the conductive plate is clamped in the clamping slot.

Preferably, a circle of recess is provided at an edge of a bottom of the deformable plate connecting hole, an edge of the deformable plate is connected and sealed with the recess.

Preferably, the conductive plate comprises a fixing portion and a connecting portion, the fixing portion is fixed with the conductive plate connecting portion, the fixing portion is connected with the connecting portion through a weak strength area, a ventilating hole is provided on the fixing portion, the deformable plate comprises a connecting head, a deformable portion and a ring-shaped connecting portion, the deformable portion is of a sheet shaped structure with a ring surface, the connecting head is located at the middle of the deformable portion, the ring-shaped connecting portion surrounds an outer edge of the deformable portion, a lower surface of the connecting head is connected with an upper surface of the connecting portion, the ring-shaped connecting portion is connected with the deformable plate connecting hole.

Preferably, the deformable plate further comprises a connecting bump, the connecting bump is protruded from the lower surface of the connecting head, the conductive plate further comprises a connecting hole, the connecting hole is provided on the connecting portion, the connecting bump is embedded into the connecting hole.

A second aspect of the present application provides a power battery, including the above top cover of the power battery.

The technical solution provided by the present application can achieve the following beneficial effect:

The top cover of the power battery and the power battery provided by the present application can make the top cover plate firmly fix with the insulation sheet through improving the structures thereof, so as to prevent the conductive plate from breaking and losing efficacy caused by self-displacement, furthermore, such connection structure occupies a smaller interior space of the power battery.

It should be understood that, the above general description and the following detailed description are just exemplary, which cannot limit the present application.

REFERENCES SIGNS

Figure 1:
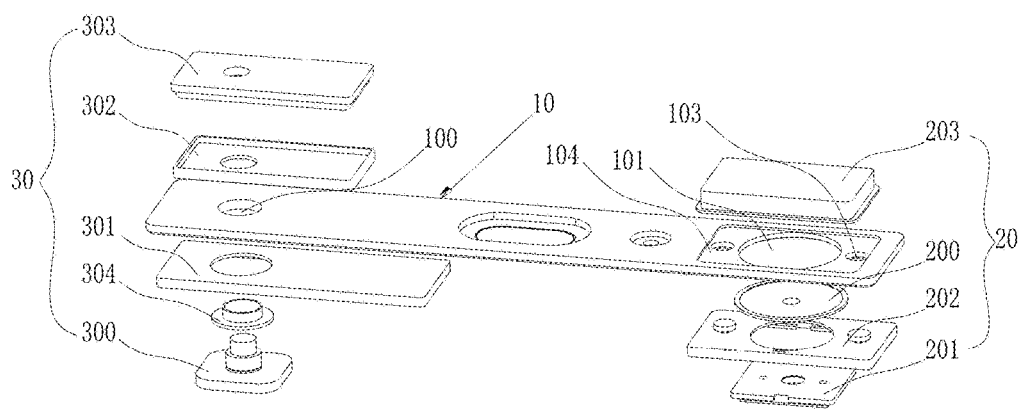
FIG. 1 is an explosive view of a top cover of a power battery according to an embodiment of the present application.
Figure 2:
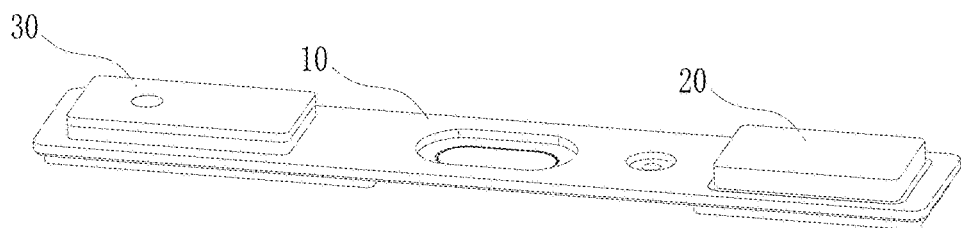
FIG. 2 is an assembling structural schematic diagram of a top cover of a power battery according to an embodiment of the present application.

10—top cover plate;
100—electrode terminal penetrating hole;
101—deformable plate connecting hole;
102—recess;
103—insulation piece accommodating portion;
104—assembling platform;
20—first electrode unit;
200—deformable plate;
200a—connecting head;
200b—deformable portion;
200c—ring-shaped connecting portion;
200d—connecting bump;
201—conductive plate;
201a—fixing portion;
201b—connecting portion;
201c—weak strength area;
201d—fixing hole;
201e—connecting hole;
201f—ventilating hole;
202—first insulation piece;
202a—top cover plate connecting portion;
202b—conductive plate connecting portion;
202c—clamping slot;
202d—assembling hole;
202e—blocking ring;
203—top cover connecting block;
30—second electrode unit;
300—electrode terminal;
301—second insulation piece;
302—third insulation piece;
303—electrode terminal connecting block;
304—sealing ring;

The drawings are incorporated into the specification and constitute as a part of the specification, which show embodiments of the present application, and are used to illustrate the principle of the present application together with the specification.

DESCRIPTION OF EMBODIMENTS

The present application will be described in further detail through specific embodiments and the accompany drawings.

The "front", "back", "left", "right", "up", "down" are referring to the placing state of the top cover of the power battery and the power battery in the drawings.

As shown in FIGS. 1-4, an embodiment of the present application provides a top cover of a power battery, including a top cover plate 10, a first electrode unit 20 and a second electrode unit 30. The top cover plate 10 is a main structure of the top cover, which needs to be made adopting conductive materials, such as an aluminum sheet. An electrode terminal penetrating hole 100 and a deformable plate connecting hole 101 are provided on the top cover plate 10. The first electrode unit 20 and the second electrode unit 30 are respectively two output poles of the power battery, each output pole is electrically connected with an electrode tab of a naked cell respectively. In the present embodiment, generally, the first electrode unit 20 can be regarded as the positive pole of the power battery, and the second electrode unit 30 can be regarded as the negative pole of the power battery.

Figure 10:
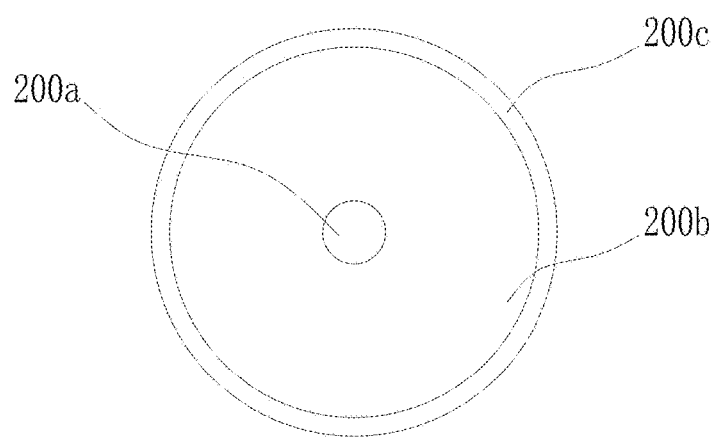
FIG. 10 is a schematic diagram of a top view structure of a deformable plate according to an embodiment of the present application.
Figure 11:
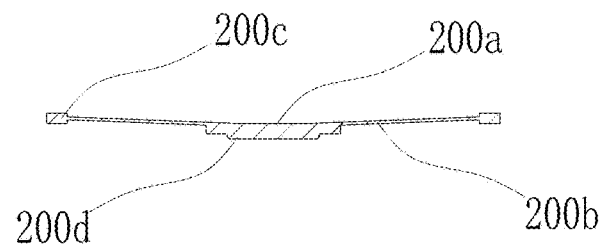
FIG. 11 is a side sectional view of FIG. 10.

As shown in FIG. 10 and FIG. 11, the first electrode unit 20 of the present embodiment includes a deformable plate 200, a conductive plate 201, a first insulation piece 202 and a top cover connecting block 203. The deformable plate 200 includes a connecting head 200a, a deformable portion 200b and a ring-shaped connecting portion 200c. The deformable portion 200b is of a sheet shaped structure with a ring surface, the connecting head 200a is located at the middle portion of the deformable portion 200b, the ring-shaped connecting portion 200c surrounds the outer edge of the deformable portion 200b.

Figure 3:
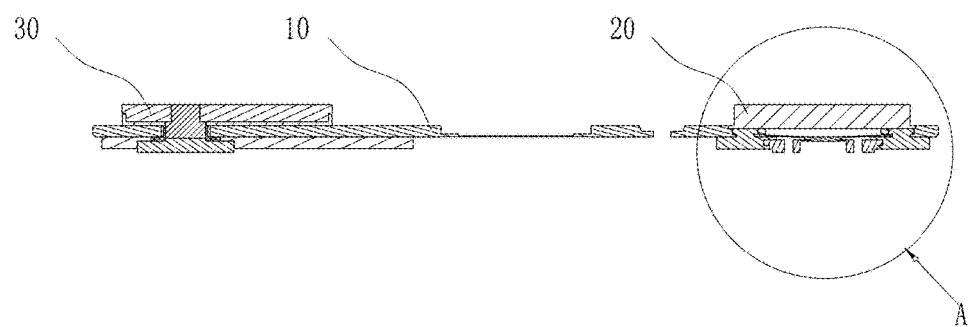
FIG. 3 is a side sectional view of FIG. 2.
Figure 4:
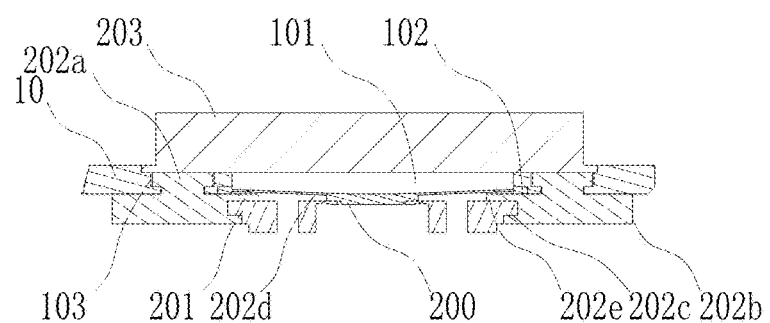
FIG. 4 is a partial enlarged structural schematic diagram of part A of the top cover of the power battery in FIG. 3, of which an insulation piece connecting portion adopts a ladder hole according to an embodiment of the present application.

Referring to FIG. 4, the deformable plate 200 is connected and sealed with the deformable plate connecting hole 101 through the ring-shaped connecting portion 200c. The deformable plate 200 is connected and sealed with the deformable plate connecting hole 101, the ring-shaped connecting portion 200c can be welded at the top or the bottom of the deformable plate connecting hole 101 (as shown in FIG. 3).

After being connected like this, the deformable plate 200 will seal the deformable plate connecting hole 101 directly, with no need of arranging a sealing piece. In addition, in order to further improve the connection strength between the deformable plate 200 and the top cover plate 10, in the present embodiment, a circle of recess 102 is provided at the edge of the bottom portion of the deformable plate connecting hole 101, the ring-shaped connecting portion 200c is located in the recess 102, and can be clamped by the recess 102, and then sealed with the recess 102, so that the connection strength can be improved effectively. Absolutely, the deformable plate can also be formed with the top cover plate as a whole, that is, the top cover plate punches a deformable plate at the deformable plate connecting hole, the deformable plate can be located at the top or the bottom of the deformable plate connecting hole 101.

Figure 12:
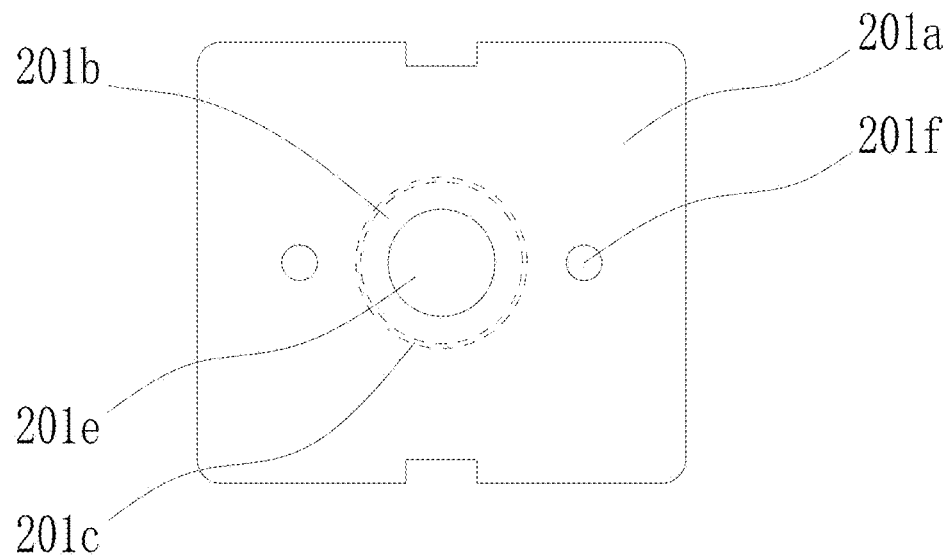
FIG. 12 is a schematic diagram of a top view structure of a conductive plate according to an embodiment of the present application.
Figure 13:
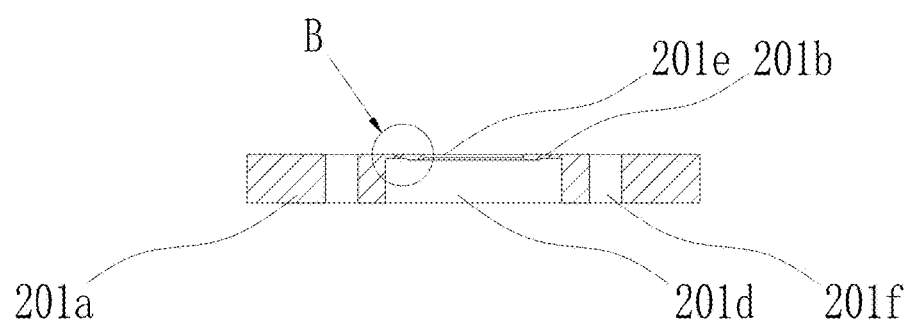
FIG. 13 is a side sectional view of FIG. 12.
Figure 14:
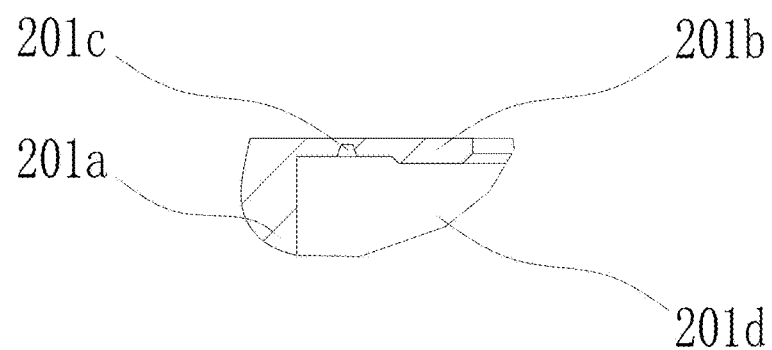
FIG. 14 is a partial enlarged structural schematic diagram of part B in FIG. 13.

Referring from FIG. 12 to FIG. 14, the conductive plate 201 includes a fixing portion 201a, a connecting portion 201b and a weak strength area 201c, the fixing portion 201a is connected with the connecting portion 201b through the weak strength area 201c. The fixing portion 201a is configured to be electrically connected with an electrode tab and, at the same time, also configured to achieve the effect of position fixing, therefore, the fixing portion can be appropriately made thicker, so as to increase the strength. However, the thickness of the connecting portion 201b can be reduced appropriately, so as to facilitate separating from the fixing portion 201a. Therefore, a fixing hole 201d can be provided at the middle portion of the fixing portion 201a, the thinner connecting portion 201b only covers the top end of the fixing hole 201d, the weak strength area 201c is arranged around the connecting portion 201b. Furthermore, the whole conductive plate 201 can firstly be processed to be formed as a whole, and then scribing a circle nick at an appropriate position as the weak strength area 201c.

The conductive plate 201 is located underneath the deformable plate 200, and fixed with the first insulation piece 202 through the fixing portion 201a, and the first insulation piece 202 is also fixed with the top cover plate 10. In the present embodiment, an insulation piece accommodating portion 103 is provided on the top cover plate 10, the connection between the first insulation piece 202 and the top cover plate 10 as well as the conductive plate 201 is extremely important, which plays a significant role to the stability of the conductive plate 201. Specifically, the first insulation piece 202 includes a top cover plate connecting portion 202a and a conductive plate connecting portion 202b, the top cover plate connecting portion 202a can be fixed with the connecting portion 202b of the conductive plate or formed as a whole, the top cover plate connecting portion 202a can be fixed in the insulation piece accommodating portion 103.

Figure 5:
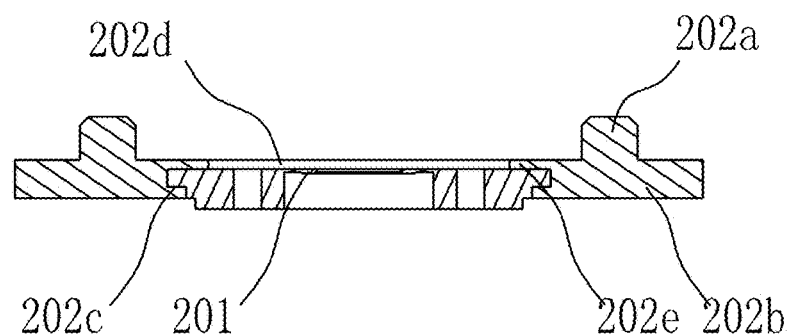
FIG. 5 is a structural schematic diagram of cooperation between a first insulation piece adopting a connection column and a conductive plate according to an embodiment of the present application.
Figure 6:
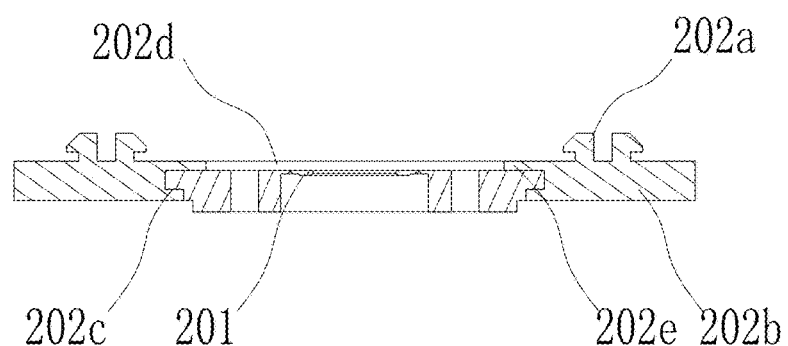
FIG. 6 is a structural schematic diagram of cooperation between a first insulation piece adopting a clamping connection structure and a conductive plate according to an embodiment of the present application.

In the present embodiment, the insulation piece accommodating portion 103 and the top cover plate connecting portion 202a can adopt multiply fixing structures. For example, the insulation piece accommodating portion 103 can be of a through hole structure with a top diameter larger than a bottom diameter, such as a ladder hole, for this structure, the top cover plate connecting portion 202a can adopt that a connecting column (referring to FIG. 5) penetrates through the ladder hole so that the head portion of the connecting column clamps the ladder hole (referring to FIG. 4) through a hot-melting manner. Or the top cover plate connecting portion 202a can also adopt a clamping connection structure (referring to FIG. 6), after the top cover plate connecting portion 202a penetrates through the insulation piece accommodating portion 103, then using the clamping manner, the shape thereof is changed so as to penetrate through the insulation piece accommodating portion 103 using the elasticity of the clamping connection structure, and then recovers back to the original shape, so that the top cover plate connecting portion 202a can be clamped with the top cover plate 10 firmly.

Figure 7:
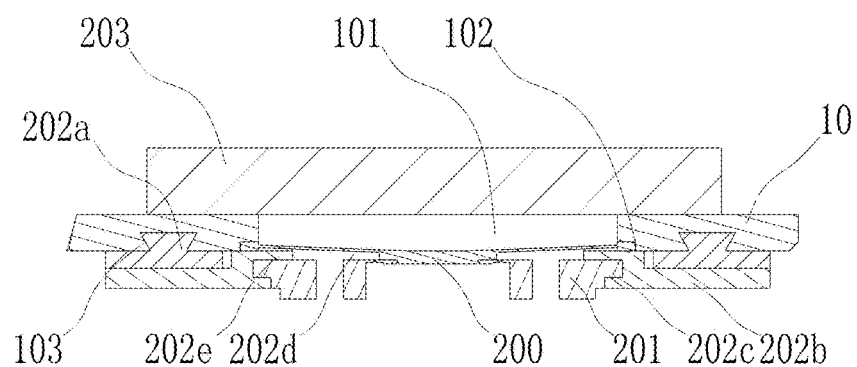
FIG. 7 is a partial enlarged structural schematic diagram of part A of the top cover of the power battery in FIG. 3, of which an insulation piece connecting portion adopts a blind hole according to an embodiment of the present application.
Figure 8:
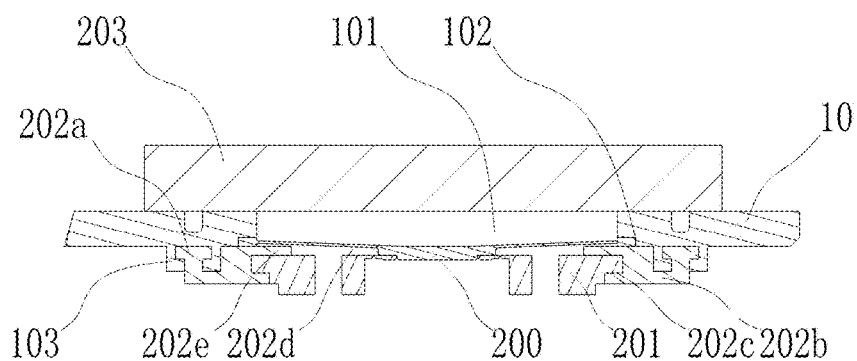
FIG. 8 is a partial enlarged structural schematic diagram of part A of the top cover of the power battery in FIG. 3, of which an insulation piece connecting portion adopts an embedded groove according to an embodiment of the present application.

Besides, the insulation piece accommodating portion 103 can also adopt a blind-hole structure (referring to FIG. 7) or an embedded groove structure (referring to FIG. 8). Similarly, when adopting the blind hole or the embedded groove structure, the top cover plate connecting portion 202a still can adopt a clamping connection structure or a hot-melting structure.

For the blind-hole structure, since only one end thereof is opened, therefore the top cover plate connecting portion 202a cannot be inserted from the bottom of the through hole and hot-melted at the top of the through hole just like the through hole connection. However, another manner can be considered, as shown in FIG. 7, a part of plastic material can be inserted into the blind hole and clamped through the hot-melting manner firstly, so as to form the top cover plate connecting portion 202a, and then the main structure of the first insulation piece 202 will be connected with the top cover plate connecting portion 202a through hot-melting, adhering or other manners.

For the embedded groove structure, an end or two ends of the embedded groove can be designed to be open, and then insert the top cover plate connecting portion 202a through an opening end of the embedded groove, so as to form a clamping connection.

Besides, according to different requirements and processing techniques, the embedded groove and the blind hole can be sunken at the lower surface of the top cover plate 10 (referring to FIG. 7), and can also be protruded at the lower surface of the top cover plate 10. Even when required, the through hole can also be provided as such.

In order to further improve the fixing effect, multiple insulation piece accommodating portions 103 can be arranged around the deformable plate connecting hole 101, at this time, the number of the top cover plate connecting portion 202a is the same as the number of the insulation piece accommodating portion 103, and the top cover plate connecting portion 202a corresponds to the insulation piece accommodating portion 103 respectively. Thus, the acting force can be dispersed, so as to make the connection of the first insulation piece 202 firmer.

The conductive plate 201 is insulated and fixed with the top cover plate 10 through the conductive plate connecting portion 202b. For convenient connection, a clamping slot 202c can be provided at the bottom of the conductive plate connecting portion 202b, the edge of the fixing portion 201a of the conductive plate 201 can be clamped in the clamping slot 202c. Thus, the conductive plate 201 can be firmly fixed on the top cover plate 10 through the first insulation piece, so as to prevent the conductive plate 201 from breaking and losing efficacy caused by self-displacement during normal assembling and using process.

Figure 9:
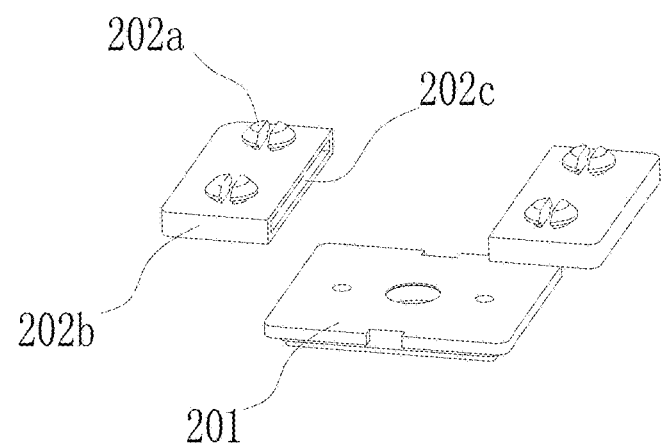
FIG. 9 is a structural schematic diagram of cooperation between a first insulation piece being divided into two independent parts and a conductive plate according to an embodiment of the present application.

As shown in FIG. 9, the conductive plate connecting portion 202b can be constituted of several independent parts, each independent part is provided with at least one top cover plate connecting portion 202a. During using, the top cover plate connecting portion 202a is fixed at the bottom of the top cover plate 10 around the deformable plate connecting hole 101, then the fixing portion 201a of the conductive plate 201 is respectively connected with each independent part.

The conductive plate connecting portion 202b can also be an integral whole, which facilitates assembling. Referring to FIG. 4, an assembling hole 202d is provided on the whole structure of the conductive plate connecting portion 202b, after the first insulation piece 202 is fixed with the top cover plate 10, the assembling hole 202d is opposite to the deformable plate connecting hole 101, the fixing portion 201a is fixed in the assembling hole 202d.

In order to improve the conductivity of the conductive plate 201, the area of the conductive plate 201 is generally made to be as large as possible, however, the overlarge conductive plate 201 will increase insulation difficulty. Therefore, the present embodiment also provides a circle of blocking ring 202e on the conductive plate connecting portion 202b, in order to fix a larger conductive plate 201, the hole diameter of the assembling hole 202d can be made larger, for example, larger than the deformable plate connecting hole 101, and the blocking ring 202e is arranged around the inner wall of the top of the assembling hole 202d, and covers the recess 102. Thus, the conductive plate 201 is fixed with the portion of the assembling hole 202e located under the blocking ring 202e, and the blocking ring 202e becomes the interlayer between the conductive plate 201 and the top cover plate 10, when assembling, as long as the conductive plate 201 abuts the blocking ring 202e firmly, the assembling firmness and good insulation can be ensured. The material of the first insulation piece 202 can be selected from insulation plastics such as PP, PE, PFA, PPS, PA and the like. The lower surface of the connecting head 200a is fixedly connected with the upper surface of the connecting portion 201b. In order to make the connection between the deformable plate 200 and the conductive plate 201 firmer, the deformable plate 200 in the present embodiment further includes a connecting bump 200d, the connecting bump 200d is protruded from the lower surface of the connecting head 200a, at the same time, the conductive plate 201 also includes a connecting hole 201e, the connecting hole 201e is provided on the connecting portion, the connecting bump 200d can be embedded into the connecting hole 201e, thus the connecting head 200a and the connecting bump 200d can be connected with the conductive plate 201 from different directions at the same time.

In normal situation, a current can be transmitted through the fixing portion 201a of the conductive plate 201 of the first electrode unit 20 to the connecting portion 201b, and then transmitted onto the top cover plate 10 through the connecting head 200a, the deformable portion 200b and the ring-shaped connecting portion 200c of the deformable plate 200. However, when assembling a battery module, it is difficult to directly connect the top cover plate 10 of each battery together, therefore, the first electrode unit 20 of the present embodiment fixes the top cover connecting block 203 on the upper surface of the top cover plate 10, so as to be used as a connecting terminal. A sunken assembling platform 104 can be formed on the upper surface of the top cover plate 10 in advance, the shape of the assembling platform 104 needs to be matched with the top cover connecting block 203, and then the top cover connecting block 203 will be embedded into the assembling platform 104 through a welding manner and the like, thus not only the connecting strength between the top cover connecting block 203 and the top cover plate 10 can be improved, a better sealing effect can also be achieved, so as to avoid leaking of the electrolyte. At this moment, the insulation piece accommodating portion 103 can be arranged in the range of the assembling platform 104, which can be kept parallel and level to the bottom of the assembling platform 104 after the top cover plate connecting portion 202a is fixed with the insulation piece accommodating portion 103, and then the top cover connecting block 203 will cover the insulation piece accommodating portion 103 when being embedded into the assembling platform 104.

When the internal air pressure of the power battery is increasing, the air pressure will act on the deformable portion 200b, making the deformable portion 200b generate an upward acting force to the connecting head 200a, however, since the connecting head 200a is fixedly connected with the connecting portion 201b, therefore the connecting head 200a will apply an upward acting force to the connecting portion 201b at the same time. This acting force will be transmitted onto the weak strength area 201c, when a sufficient pressure is reached, the weak strength area 201c will be torn, the deformable portion 200b turns, which makes the connecting head 200a drive the connecting portion 201b to move upward in the deformable plate connecting hole 101. After moving, the fixing portion 201a is separated from the connecting portion 201b, so as to cut off the current.

In order to make the air pressure successfully act on the deformable portion 200b, absolutely, the first insulation piece 202 and the conductive plate 201 will not block off the bottom of the deformable portion 200b, but leave a passage communicating with the interior of the power battery. This passage can be achieved by providing a ventilating hole 201f on the fixing portion 201a.

Please refer to FIG. 1 and FIG. 2 again, the second electrode unit 30 in the present embodiment includes an electrode terminal 300, a second insulation piece 301, a third insulation piece 302 and an electrode terminal connecting block 303. The electrode terminal 300 is located in the electrode terminal penetrating hole 100, at the same time, the second insulation piece 301 is located between the electrode terminal 300 and the top cover plate 10, so that the electrode terminal 300 is insulated from the top cover plate 10. In a general situation, only the middle portion of the electrode terminal 300 is located in the electrode terminal penetrating hole 100, the top end and the bottom end thereof are both located at the outside of the electrode terminal penetrating hole 100, in addition, in order to increase the connecting area, the bottom of the electrode terminal 300 will be increased transversely to form a platform. In this situation, the second insulation piece 301 is not only located between the electrode terminal 300 and the electrode terminal penetrating hole 100, but also extended to the lower surface of the top cover plate 10, so as to ensure that there is no contact between the platform of the electrode terminal 300 and top cover plate 10. The electrode terminal connecting block 303 is located at the upper surface of the top cover plate 10, which has the same function as the top cover connecting portion 203, that is, being used as the connecting terminal as well, so as to overcome the difficultly of directly connecting with the electrode terminal 300. Since the top cover plate 10 is already electrically connected with the positive electrode of the naked cell, therefore, the electrode terminal connecting block 303 needs to be insulated from the top cover plate 10 through the third insulation piece 302, so as to prevent short circuit. Besides, in order to prevent the electrolyte leaking from the second electrode unit 30 and, at the same time, insulate the electrode terminal located in the electrode terminal penetrating hole 100 from the top cover plate 10, a sealing ring 304 and other sealing structures can be further arranged, which will not be repeated here.

Figure 15:
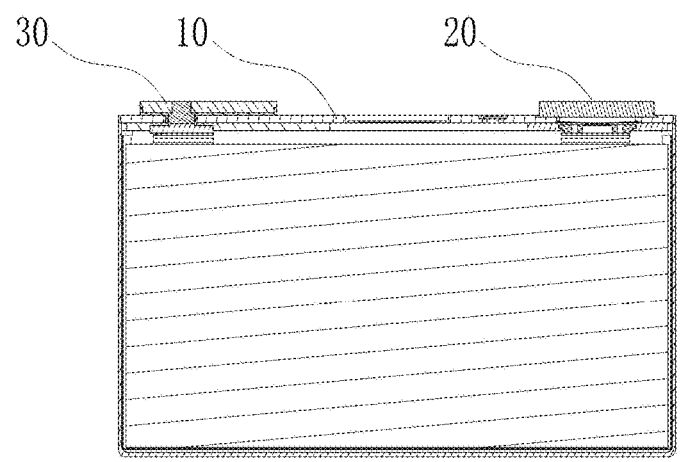
FIG. 15 is a side sectional view of a PHEV2-model power battery assembled with a top cover of a power battery according to an embodiment of the present application.

Taking the PHEV2 type power battery as an example, as shown in FIG. 15, assuming that the width of the top cover thereof is 25 mm, then the deformable plate 200 can be made with a diameter of 22 mm, the diameter of the deformable area 200b is 20 mm. The current flowing area comparing to the prior structure is significantly improved. Besides, when the deformable plate 200 is deforming, the deformable plate connecting hole 101 can achieve the effect of avoiding the deformable plate 200, the deformable plate 200 can directly turn in the deformable plate connecting hole 101 of the top cover plate 10, therefore, the thickness of the deformable plate 200 will not occupy the interior space of the power battery, thereby substantially reducing the total thickness. At the same time, the thickness of the first electrode unit 20 is almost the same as the thickness of the second electrode unit 30, which balances the distribution of the thickness of the top cover, the wasted space becomes smaller when connecting with the naked cell, thereby also taking full advantage of space. Furthermore, the conductive plate 201 can be fixed firmly by the first insulation piece 202.

The above are just the preferred embodiments of the present application, which will not limit the present application, for those skilled in the art, the present application can have various modifications and variations. Any modifications, equivalent replacements and improvements made within the spirit and principle of the present application shall fall in the protection scope of the present application.

What is claimed is:

1. A top cover of a power battery, comprising a top cover plate, a first electrode unit and a second electrode unit, the top cover plate is provided with a deformable plate connecting hole and an insulation piece accommodating portion, the first electrode unit comprises a deformable plate, a conductive plate and a first insulation piece, the deformable plate is electrically connected with the top cover plate and seals the deformable plate connecting hole, the conductive plate is located underneath the deformable plate, and is electrically connected with the deformable plate, the first insulation piece comprises a top cover plate connecting portion and a conductive plate connecting portion, the top cover plate connecting portion extends into the insulation piece accommodating portion and is fixed with the insulation piece accommodating portion, the conductive plate is fixed with the top cover plate through the conductive plate connecting portion, the deformable plate deforms and is insulated from the conductive plate when a pressure in an interior of the power battery exceeds a reference pressure.

2. The top cover of the power battery according to claim 1, wherein the insulation piece accommodating portion is a through hole with a top diameter larger than a bottom diameter.

3. The top cover of the power battery according to claim 1, wherein the insulation piece accommodating portion is a blind hole with a top diameter larger than a bottom diameter.

4. The top cover of the power battery according to claim 1, wherein the insulation piece accommodating portion is an embedded groove.

5. The top cover of the power battery according to claim 3, wherein the blind hole is sunken at a lower surface of the top cover plate,
or
the blind hole is protruded from a lower surface of the top cover plate.

6. The top cover of the power battery according to claim 4, wherein
the embedded groove is sunken at a lower surface of the top cover plate, or
the embedded groove is protruded from a lower surface of the top cover plate.

7. The top cover of the power battery according to claim 2, wherein the top cover plate connecting portion is a connecting column, the connecting column extends into the insulation piece accommodating portion, and is fixed with the insulation piece accommodating portion through hot melting.

8. The top cover of the power battery according to claim 2, wherein the top cover plate connecting portion is a clamping connection structure, the clamping connection structure is clamped with the insulation piece accommodating portion.

9. The top cover of the power battery according to claim 1, wherein multiple insulation piece accommodating portions are defined, which are arranged around the deformable plate connecting hole, the number of the top cover plate connecting portion is the same as the number of the insulation piece accommodating portion, and the top cover plate connecting portion corresponds to the insulation piece accommodating portion respectively.

10. The top cover of the power battery according to claim 9, wherein the conductive plate connecting portion comprises a plurality of independent parts, each of the independent part is provided with at least one top cover plate connecting portion.

11. The top cover of the power battery according to claim 1, wherein an assembling hole is provided on the conductive plate connecting portion, the assembling hole is opposite to the deformable plate connecting hole, the conductive plate is fixed in the assembling hole.

12. The top cover of the power battery according to claim 11, wherein the conductive plate connecting portion is further provided with a circle of blocking ring, a hole diameter of the assembling hole is larger than the deformable plate connecting hole, the blocking ring is arranged around an inner wall of a top of the assembling hole, and covers the deformable plate connecting hole.

13. The top cover of the power battery according to claim 11, wherein a circle of clamping slot is provided at a bottom of the conductive plate connecting portion, an edge of the conductive plate is clamped in the clamping slot.

14. The top cover of the power battery according to claim 1, wherein a circle of recess is provided at an edge of a bottom of the deformable plate connecting hole, an edge of the deformable plate is connected and sealed with the recess.

15. The top cover of the power battery according to claim 1, wherein the conductive plate comprises a fixing portion and a connecting portion, the fixing portion is fixed with the conductive plate connecting portion, the fixing portion is connected with the connecting portion through an area that is torn when the pressure in the interior of the power battery exceeds the reference pressure, a ventilating hole is provided on the fixing portion, the deformable plate comprises a connecting head, a deformable portion and a ring-shaped connecting portion, the deformable portion is of a sheet shaped structure with a ring surface, the connecting head is located at the middle of the deformable portion, the ring-shaped connecting portion surrounds an outer edge of the deformable portion, a lower surface of the connecting head is connected with an upper surface of the connecting portion, the ring-shaped connecting portion is connected with the deformable plate connecting hole.

16. The top cover of the power battery according to claim 15, wherein the deformable plate further comprises a connecting bump, the connecting bump is protruded from the lower surface of the connecting head, the conductive plate further comprises a connecting hole, the connecting hole is provided on the connecting portion, the connecting bump is embedded into the connecting hole.

17. A power battery, wherein comprising the top cover of the power battery according to claim 1.

* * * * *